(12) United States Patent
Maeda

(10) Patent No.: US 10,223,264 B2
(45) Date of Patent: *Mar. 5, 2019

(54) DATA ACCESS CONTROL APPARATUS

(71) Applicant: Toshiba Memory Corporation, Minato-ku, Tokyo (JP)

(72) Inventor: Seiji Maeda, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,930

(22) Filed: May 4, 2018

(65) Prior Publication Data

US 2018/0253378 A1    Sep. 6, 2018

Related U.S. Application Data

(63) Continuation of application No. 14/942,535, filed on Nov. 16, 2015, now Pat. No. 9,990,285.

(60) Provisional application No. 62/193,215, filed on Jul. 16, 2015.

(51) Int. Cl.
*G06F 12/00* (2006.01)
*G06F 12/0804* (2016.01)
*G06F 12/0871* (2016.01)
*G06F 12/0888* (2016.01)
*G06F 12/126* (2016.01)

(52) U.S. Cl.
CPC ...... *G06F 12/0804* (2013.01); *G06F 12/0871* (2013.01); *G06F 12/0888* (2013.01); *G06F 12/126* (2013.01); *G06F 2212/1016* (2013.01)

(58) Field of Classification Search
CPC ............. G06F 12/0804; G06F 12/0871; G06F 12/0888; G06F 12/126; G06F 2212/1016
See application file for complete search history.

(56) References Cited

U.S. PATENT DOCUMENTS

| 7,243,189 B2 | 7/2007 | Nagasoe et al. |
| 8,677,061 B2 | 3/2014 | Kurashige |
| 8,825,937 B2 | 9/2014 | Atkisson et al. |
| 8,949,547 B2 | 2/2015 | Mannava et al. |

*Primary Examiner* — Matthew Bradley
(74) *Attorney, Agent, or Firm* — White & Case LLP

(57) ABSTRACT

A data access control apparatus of an embodiment includes an update region management apparatus including an update region management unit configured to record, in response to a writing request for data from an input apparatus, management information of a first address region in which the data is stored, a reading request management unit configured to record a second address specified in a reading request from a storage apparatus and a control unit configured to receive the writing request and the reading request, and control processing of the reading request and updating of the update region management unit and the reading request management unit.

14 Claims, 2 Drawing Sheets

DATA ACCESS CONTROL APPARATUS

CROSS-REFERENCE TO RELATED APPLICATIONS

This application is a continuation of application Ser. No. 14/942,535, filed Nov. 16, 2015 and is based upon and claims the benefit of U.S. Provisional Application No. 62/193,215, filed Jul. 16, 2015, the entire contents of which are incorporated herein by reference.

FIELD

An embodiment described herein relates generally to a data access control apparatus.

BACKGROUND

Conventionally, when data of an input apparatus such as a camera is stored in an external storage apparatus such as a memory card, a procedure is used in which after a process of writing data from the input apparatus to a main memory is completed, the data is read from the main memory and stored in the external storage apparatus. Generally, when data is stored in the external storage apparatus, there is a need for a control process such as generation of a control command for the external storage apparatus, a management process such as information updating of a file system that manages a data arrangement on the external storage apparatus or the like in addition to a data transfer process. Normally, a storage process such as the control process or the management process is mainly executed by a processor.

In recent years, along with improving image quality of cameras or the like, transfer rates of input data are also improving. Furthermore, along with improving performance of output apparatuses such as memory cards, transfer rates of output data are also improving. For this reason, speed enhancement is also required for storage processes and processors are required to have higher performance.

However, there is a problem that use of a high performance processor causes a significant increase in power consumption. Alternatively, performance of the processor may not catch up with the improvement of the transfer rate, resulting in a problem that data can be stored only at a transfer rate lower than a transfer rate provided for an input apparatus or an external storage apparatus. In the case of video recording, for example, when a transfer rate of input data cannot be controlled, there is also a problem that the input data is dropped and the data is lost.

DETAILED DESCRIPTION

Hereinafter, an embodiment will be described with reference to the accompanying drawings.
(Configuration)

Figure 1:
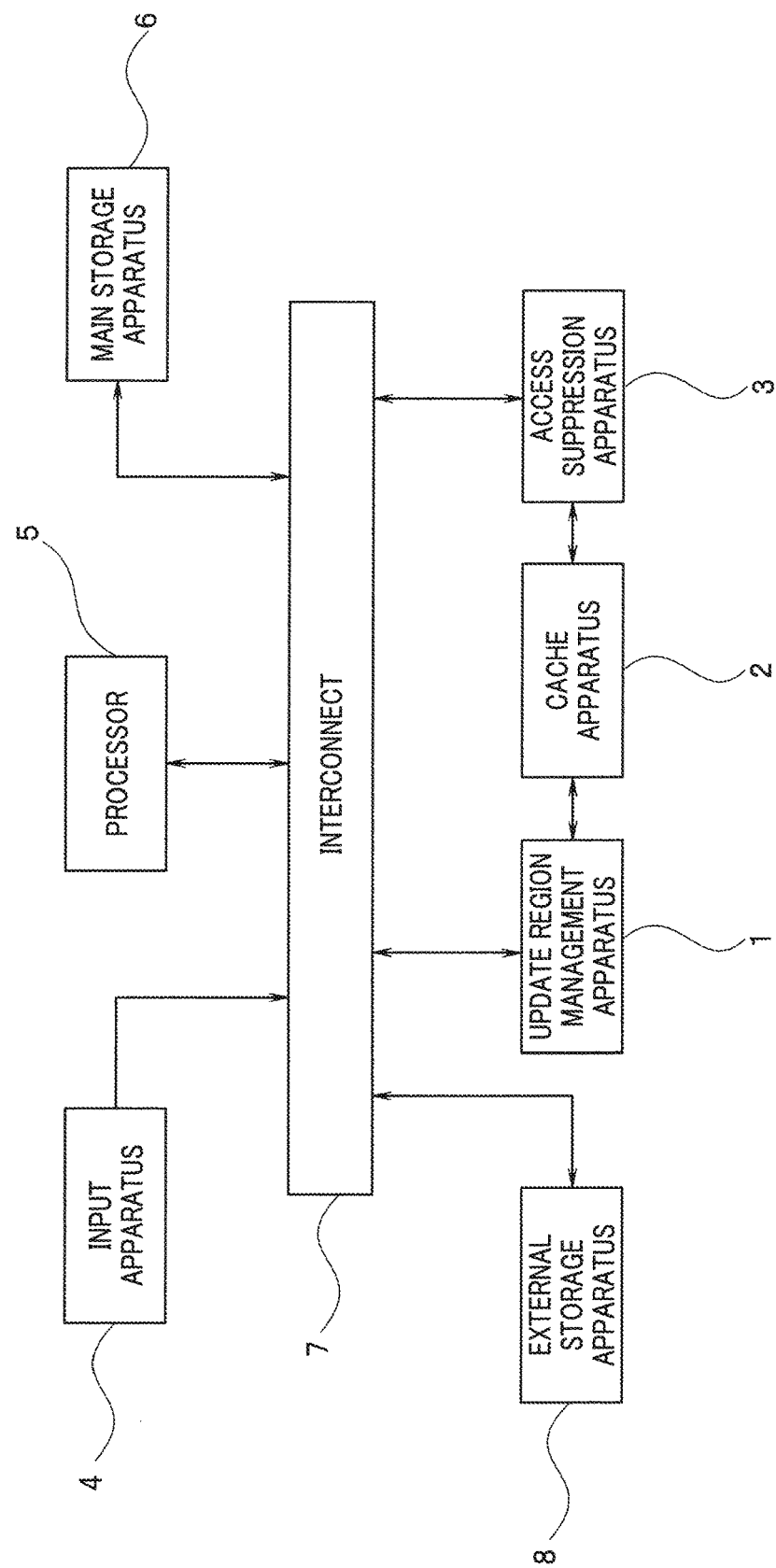
FIG. 1 is a schematic block diagram describing an example of a system including a data access control apparatus of an embodiment.

FIG. 1 is a schematic block diagram describing an example of a system including a data access control apparatus of an embodiment of the present invention. The system of the present embodiment is mainly configured by an update region management apparatus 1, a cache memory 2, an access suppression apparatus 3, an input apparatus 4, a processor 5 including a central processing unit (hereinafter referred to as "CPU"), a main memory 6, an interconnect 7, and an external storage apparatus 8. The data access control apparatus is configured by the update region management apparatus 1. Note that the data access control apparatus may also be configured by including the cache memory 2 and the access suppression apparatus 3 in addition to the update region management apparatus 1. Furthermore, the data access control apparatus may also be configured by only the cache memory 2 and the access suppression apparatus 3.

The update region management apparatus 1, the access suppression apparatus 3, the input apparatus 4, the processor 5, the main memory 6 and the external storage apparatus 8 are interconnected via the interconnect 7. Furthermore, the cache memory 2 is connected to the update region management apparatus 1 and the access suppression apparatus 3, and is accessible from the interconnect 7 via these apparatuses.

The update region management apparatus 1 is configured to manage an address region in which data inputted from the input apparatus 4 is registered. For example, a buffer for the input apparatus reserved in the main memory 6 manages an address region in which data is registered hereafter. The update region management apparatus 1 is also configured to receive a writing request from the input apparatus 4 or a reading request from the external storage apparatus 8, suspend/resume a writing process or a reading process or update management data in the above-described address region.

The cache memory 2 is configured to temporarily store various types of data stored in the main memory 6. More specifically, the cache memory 2 is configured to hold data stored from the processor 5, data inputted from the input apparatus 4 or data acquired from the main memory 6.

The access suppression apparatus 3 is configured to control data writing from the cache memory 2 to the main memory 6. More specifically, the access suppression apparatus 3 monitors data written from the cache memory 2 to the main memory 6 and suppresses, when the data to be written is not reused, the data writing to the main memory 6.

The input apparatus 4 is configured to cause the main memory 6 to store data. For example, a camera corresponds to the input apparatus 4.

The processor 5 is configured to control the update region management apparatus 1 and the access suppression apparatus 3. More specifically, when the input apparatus 4 writes data to the main memory 6, the processor 5 sets a start address and a size of a data writing region and instructs the input apparatus 4 to start input. Moreover, when the external storage apparatus 8 reads data from the main memory 6, the processor 5 specifies a start address and a size of a data reading region and instructs the main memory 6 to start output.

The main memory 6 is configured to store data outputted from the processor 5, the input apparatus 4, the external storage apparatus 8 and the cache memory 2.

The external storage apparatus 8 is configured to store data or the like generated by the input apparatus 4. For example, a memory card or an SSD (solid state disk) corresponds to the external storage apparatus 8.

Figure 2:
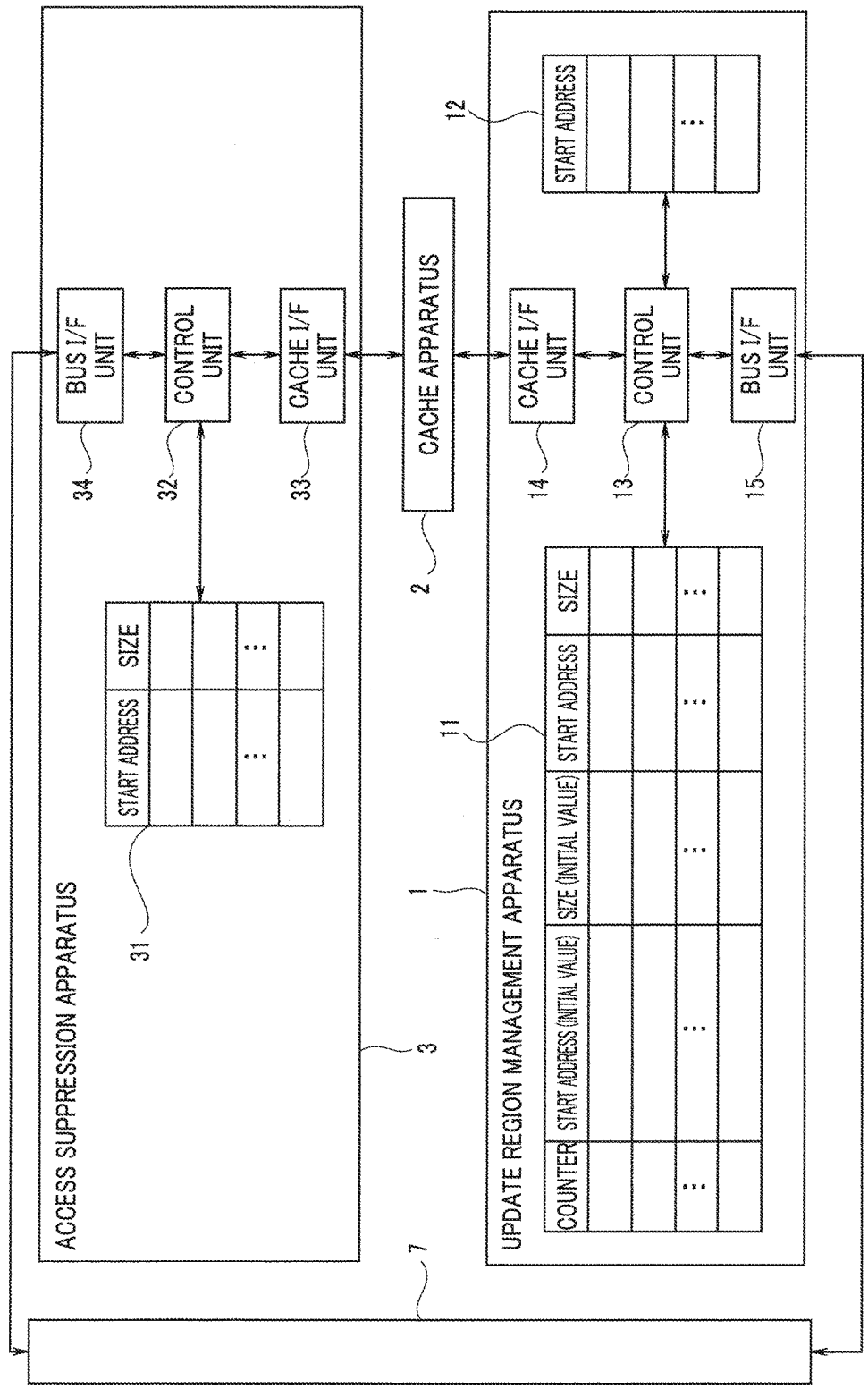
FIG. 2 is a schematic block diagram describing an example of an update region management apparatus 1 and an access suppression apparatus 3 of the embodiment.

Next, detailed configurations of the update region management apparatus 1 and the access suppression apparatus 3 will be described using FIG. 2. FIG. 2 is a schematic block diagram describing an example of the update region management apparatus 1 and the access suppression apparatus 3 of the embodiment.

The update region management apparatus 1 is mainly configured by an update region management table 11, a reading request wait management table 12, a control unit 13, a cache I/F unit 14 for reading/writing data from/to the cache memory 2, and a bus I/F unit 15 for transmitting/receiving data to/from the interconnect 7.

The update region management table 11 as the update region management unit is configured to manage an address region in which data from the input apparatus 4 is registered and a size thereof. The update region management table 11 is configured by one or more update region entries. The number of update region entries is, for example, the same as the number of buffers for the input apparatus provided for the system, and the respective update region entries are in a one-to-one correspondence with the buffers for the input apparatus. For example, when the system is provided with three buffers for the input apparatus, the update region management table 11 is configured by three update region entries.

Each update region entry is configured by five fields: a counter, a start address (initial value), a size (initial value), a start address, and a size. The counter indicates the number of times the address region indicated by the entry is reused and an integer value of 0 or greater (value corresponding to the amount of data inputted from the input apparatus 4) is set therein. The start address (initial value) and the size (initial value) indicate the start address and the size of the corresponding buffer for the input apparatus and are preset values. The start address and the size indicate the start address and the size of a region to which input data is written from the input apparatus 4. Therefore, in a state before input data is written, the same value as the start address (initial value) is stored in the start address and the same value as the size (initial value) is stored in the size.

The reading request wait management table 12 as the reading request management unit is configured to manage the address region of a reading request from the external storage apparatus 8. The reading request wait management table 12 is configured by one or more reading request entries. The number of reading request entries may be, for example, the same as or smaller than the number of update region entries. The start address of the address region of the reading request is stored in each reading request entry.

The control unit 13 is configured to receive a writing request or a reading request and suspend/resume a writing process or a reading process. The control unit 13 is also configured to update the update region management table 11 or the reading request wait management table 12.

When a writing access request or a reading access request is made, the cache I/F unit 14 is configured to make an access request to the cache memory 2 as required.

The bus I/F unit 15 is configured to input a writing request from the input apparatus 4 to the update region management apparatus 1, input a reading request from the external storage apparatus 8 to the update region management apparatus 1 or output read data from the update region management apparatus 1 to the external storage apparatus 8 or input various control instructions from the processor 5 to the update region management apparatus 1.

The access suppression apparatus 3 is mainly configured by an access suppression table 31, a control unit 32, a cache I/F unit 33 for transmitting/receiving data to/from the cache memory 2 and a bus I/F unit 34 for transmitting/receiving data to/from the interconnect 7.

Among the data that is likely to be written from the cache memory 2 to the main memory 6, the access suppression table 31 as the access suppression management unit manages the address region (re-update region) storing data that is not reused and so need not to be written and the size thereof. That is, the address region of data transferred from the input apparatus 4 to the external storage apparatus 8 is stored in the access suppression table 31. The access suppression table 31 is configured by one or more access suppression entries. The maximum number of access suppression entries is the same as the number of update region entries.

Each access suppression entry is configured by two fields: a start address and a size. The start address and the size represent the start address and the size of a region in which input data is written from the input apparatus 4, the region storing data that is not reused and so need not to be written to the main memory 6. Therefore, among update region entries, the same values as the values of the start address (initial value) and the size (initial value) of the entries whose counter value is one or more are stored in the fields of the start address and the size of each access suppression entry.

When a data writing request is made from the cache memory 2 to the main memory 6, the control unit 32 is configured to end the writing request without writing data to the main memory 6 based on the access suppression table 31 or update the access suppression table 31.

The cache I/F unit 33 is an interface configured to receive an access request from the cache memory 2 to the main memory 6 or send data to the cache memory 2 when a reading access request is made from the cache memory 2 to the main memory 6.

The bus I/F unit 34 is configured to send an access request from the cache memory 2 to the main memory 6, read data from the main memory 6 to the cache memory 2 or input various control instructions from the processor to the access suppression apparatus 3.

(Operation)

Next, operation of the system in the present embodiment will be described. First, input start processing of data (hereinafter referred to as "input data") inputted from the input apparatus 4 by the processor 5, storage management processing of the input data and an output start process for writing the input data to the external storage apparatus 8 will be described.

1) Input Preparation Process

The processor 5 sets, in the update region management table 11, the start address and the size of a region to which the input data is written. More specifically, the processor 5 sets the start address of the writing region in the start address (initial value) and the start address of each update region entry. The processor 5 also sets the size of the writing region in the size (initial value) and the size of each update region entry. In order for the input apparatus 4 to write all input data, the processor 5 calculates how many times writing is performed to the address region with which each update region entry is associated and sets the number of times writing is performed to the counter of each update region entry.

For example, it is supposed that the system is provided with three buffers for the input apparatus: a buffer 0, a buffer 1 and a buffer 2, and the respective update region entries are configured to be in a one-to-one correspondence with the buffers for the input apparatus. If input data corresponding to 24 buffers is written, since input data is written 8 times for each buffer, "8" is set in the counter of each update region entry.

Next, the processor 5 sets the start address and the size of the writing region in the access suppression table 31. More specifically, access suppression entries in the same number as that of the update region entries are set in the access suppression table 31. Since three update region entries are set in the update region management table 11, three access suppression entries are set in the access suppression table 31 as well. The same values as those of the start address and the size of the corresponding update region entry are set in the start address and the size of each access suppression entry.

2) Input Start Process

The processor 5 specifies the start address and the size of the writing region for the input apparatus 4 and instructs the input apparatus 4 to start input. The processor 5 specifies the start address and the size of the buffer that is used first (e.g., buffer 0) among the three buffers for the input apparatus and instructs the buffers to start data input.

3) Storage Management Process

The processor 5 determines the position (output data storage position) at which input data from the input apparatus 4 is stored in the external storage apparatus 8.

4) Output Start Process

The processor 5 specifies the start address and the size of the region from which input data is read for the external storage apparatus 8. The start address and the size of the reading region coincide with the start address and the size of the writing region. The processor 5 instructs the external storage apparatus 8 to start outputting the input data.

Note that the processor 5 normally performs processes in order of an input preparation process, an input start process, a storage management process, and an output start process, however since in the present invention, the input preparation process is performed before the input start process and the output start process, and the storage management process needs only to be performed before the output start process, processes may be performed in order of, for example, the storage management process, the input preparation process, the output start process and the input start process.

Next, operation of the external storage apparatus 8 of reading input data upon receiving an output start instruction from the processor 5 will be described. In the present embodiment, once an instruction of starting output of input data is issued, the external storage apparatus 8 can start an input data reading process before the input data is written from the input apparatus 4 to the buffer. Such a case where the external storage apparatus 8 performs the input data reading process before the input data is written will be described below.

5) Input Data Reading Process

First, the external storage apparatus 8 specifies the address and notifies the update region management apparatus 1 of a reading request. The address specified in the reading request is the start address of the reading region specified from the processor 5 in the output start process.

The control unit 13 confirms whether the specified address of the reading request is included in the address region associated with each update region entry of the update region management table 11 or not.

When the address of the reading request is included in the address region, the data to be read cannot yet be read because the data has not yet been written from the input apparatus 4 to the buffers for the input apparatus. For this reason, the control unit 13 registers the address of the reading request with the reading request wait management table 12 and puts the processing of the reading request on hold.

When the address of the reading request is not included in the address region, the control unit 13 notifies the cache memory 2 of the reading request. Upon receiving notification of the data on the reading request from the cache memory 2, the control unit 13 notifies the external storage apparatus 8 of the data.

Next, operation of the input apparatus 4 of writing the input data upon receiving an input start instruction from the processor 5 will be described. In the present embodiment, the external storage apparatus 8 can start an input data reading process before the input apparatus 4 writes the input data to the buffer. Therefore, when the input apparatus 4 writes the input data, the external storage apparatus 8 may have already sent a reading request to the update region management apparatus 1. In that case, the address of the reading request is registered with the reading request wait management table 12.

6) Input Data Writing Process

First, the input apparatus 4 notifies the update region management apparatus 1 of a writing request made up of the input data and the address of the writing destination. The control unit 13 confirms whether the address of the writing request is identical to the address set in the start address of each update region entry or not.

When an address identical to the address of the writing request is set in the start address of the update region entry, the start address of the update region entry is incremented by the size of the input data to be written. Furthermore, the size of the update region entry is decremented by the size of the input data to be written. When the size becomes 0, the counter of the entry is decremented by 1.

Here, when the counter of the update region entry becomes 0, the control unit 13 notifies the access suppression apparatus 3 to disable the access suppression entry corresponding to the update region entry in the access suppression table 31. Upon receiving the notification, the control unit 32 deletes the specified access suppression entry from the access suppression table 31.

On the other hand, when the counter of the update region entry does not become 0, values of the start address (initial value) and the size (initial value) are set in the start address and the size of the update region entry.

Next, the control unit 13 confirms whether the address of the writing request is included in the reading request entry of the reading request wait management table 12 or not. When the writing request address is included, since the reading request processing of the address is on hold, the input data of the writing request is notified to the external storage apparatus 8 as the data of the reading request. Since the reading process has been completed, the control unit 13 deletes the entry of the reading request wait management table 12.

On the other hand, when the address of the writing request is not included, the control unit 13 notifies the cache memory 2 of the writing request.

Next, operation of the cache memory 2 and the access suppression apparatus 3 when the cache memory 2 is notified of a writing request or a reading request will be described.

7) Operation of Cache Memory 2 and Access Suppression Apparatus 3

First, the cache memory 2 replaces a cache line according to a writing request or a reading request.

When the cache line to be replaced is data to be written, the cache memory 2 notifies the access suppression apparatus 3 of a writing request for the data to the main memory 6. The control unit 32 confirms whether the address of the notified writing request is included or not in the address region with which each access suppression entry of the access suppression table 31 is associated. When the address of the writing request is included in the address region, it is possible to determine that the data to be written is data that cannot be reused such as transfer data from the input apparatus 4 to the external storage apparatus 8. For this reason, the writing request is completed without writing the data to the main memory 6. On the other hand, when the address of the writing request is not included in the address region, the control unit 32 notifies the main memory 6 of the writing request.

Note that other operation of the cache memory 2 is similar to that of a normal cache memory.

Thus, according to the present embodiment, when the input apparatus 4 transfers data to the external storage apparatus 8, the control from the processor 5 maintains a general control sequence (input preparation process, input start process, storage management process and output start process). However, in the input start process, the processor 5 is notified of the completion of the input before writing of input data from the input apparatus 4 is completed. For this reason, the processor 5 starts the storage management process before the writing is completed. Furthermore, the storage management process is followed by the output start process, that is, the external storage apparatus 8 is instructed to start writing. Thus, the external storage apparatus 8 starts reading data before the input data is read.

On the other hand, the processor 5 sets a region in which input data is written to the update region management table 11 in the input preparation process. Therefore, when reading the input data, the external storage apparatus 8 looks up the update region management table 11. When the region in which the data is stored is included in the update region management table 11, the address of a reading request is registered with the reading request wait management table 12 and the processing of the reading request is put on hold. When the data is actually written, the hold of the reading request is canceled and the data is notified to the external storage apparatus 8. Thus, since the storage management process is completed before the data is inputted, it is possible to directly transfer the input data to the external storage apparatus 8 and transfer the data at transfer rates of the input apparatus 4 and the external storage apparatus 8 regardless of the performance of the processor 5.

Furthermore, according to the present embodiment, the region in which data to be transferred by the input apparatus 4 to the external storage apparatus 8 is written is set in the access suppression table 31. Therefore, when a writing request from the cache memory 2 to the main memory 6 is generated, the access suppression table 31 is referenced. When the address of the writing request is included in the region of the access suppression table 31, the request is terminated without writing it to the main memory 6. Since the regions set in the access suppression table 31 are addresses of data not reused, it is possible to suppress writing of useless data to the main memory 6.

Note that the above-described embodiment is configured to connect the update region management apparatus 1, the access suppression apparatus 3, the input apparatus 4, the processor 5, the main memory 6, and the external storage apparatus 8 to the same interconnect 7, but the embodiment may also be configured, for example, in such a way that two interconnects of a first interconnect and a second interconnect are provided, the access suppression apparatus 3, the processor 5 and the main memory 6 are connected to the first interconnect, and the update region management apparatus 1, the input apparatus 4 and the external storage apparatus 8 are connected to the second interconnect. Such a configuration allows the second interconnect to be used as a data transfer route from the input apparatus 4 to the external storage apparatus 8.

As described above, according to the present embodiment, data can be transferred reliably at transfer rates of the input apparatus and the external storage apparatus regardless of the performance of the processor.

Each "unit" such as a module in the present specification is a conceptual one corresponding to each function of the embodiment and is not necessarily in a one-to-one correspondence with specific hardware or a software routine. Therefore, in the present specification, the embodiment has been described assuming a virtual circuit block (unit) provided with the respective functions of the embodiment.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A data access control apparatus comprising:
a cache memory; and
an access suppression apparatus configured to monitor a writing request for data from the cache memory to a main memory and suppress, when an address region in which the data is stored is included in a predetermined address region, writing of the data to the main memory,
wherein the access suppression apparatus comprises one or more access suppression entries to record information of the predetermined address region and each of the access suppression entries is provided with a start address indicating a start of an address region of the predetermined address region and a size of the data that can be written to the address region identified by the start address, and
the access suppression apparatus compares the information of the predetermined address region with contents of the writing request and controls the writing of the data.

2. A data access control apparatus comprising:
an update region management apparatus configured to record management information of a first address region updated by a first writing request from an input apparatus, receive the first writing request and a reading request from a storage apparatus and suspend and resume the reading request based on the management information;
a cache memory; and
an access suppression apparatus configured to monitor a second writing request for data from the cache memory to a main memory and suppress, when a second address region in which the data is stored is a predetermined address region, writing of the data,
wherein the update region management apparatus comprises an update region management unit configured to record management information of the first address region, a reading request management unit configured to record a third address specified by the reading request and a first control unit configured to process the reading request and control updating of the update region management unit and the reading request management unit, and the access suppression apparatus comprises an access suppression management unit configured to record management information of the predetermined address region and a second control unit configured to compare management information of the predetermined address region with contents of the writing request to the main memory and control processing of the second writing request to the main memory.

3. The data access control apparatus according to claim 2, wherein the first address region and the predetermined address region are identical regions.

4. The data access control apparatus according to claim 2, wherein the second control unit updates management information of the predetermined address region in conjunction with update of management information of the first address region by the first control unit.

5. The data access control apparatus according to claim 2, wherein the update region management unit is provided with one or more update region entries to record management information of the first address region and each of the update region entries is provided with a start address indicating a start of an address region in which the data is stored and a size of the data that can be written to the address region.

6. The data access control apparatus according to claim 5, wherein each of the update region entries is further provided with a counter configured to indicate a number of times the data is written to the address region identified by the start address.

7. The data access control apparatus according to claim 5, wherein when the second address is included in the first address region, the first control unit puts the reading request on hold and records the second address in the reading request management unit.

8. The data access control apparatus according to claim 7, wherein upon receiving notification of the writing request, the first control unit extracts the update region entry having a value identical to an address of the writing request registered in the start address, and increments the start address of the extracted update region entry by a size of the data or decrements the size by the size of the data.

9. The data access control apparatus according to claim 8, wherein when the address of the writing request is included in the reading request management unit, the first control unit executes the processing of the reading request and outputs the data to the storage apparatus.

10. The data access control apparatus according to claim 9, wherein the access suppression management unit is provided with one or more access suppression entries to record the management information and each of the access suppression entries is provided with a start address indicating a start of the predetermined address region and a size of the data that can be written to the address region identified by the start address.

11. The data access control apparatus according to claim 6, wherein upon receiving notification of the writing request, the first control unit extracts the update region entry having a value identical to an address of the writing request registered in the start address, increments the start address of the extracted update region entry by a size of the data or decrements the size by the size of the data and further decrements the counter value by 1 when the size becomes 0.

12. The data access control apparatus according to claim 11, wherein the second control unit disables the access suppression entries corresponding to the update region entries in which the counter indicates 0.

13. A data access control apparatus comprising:
an update region management apparatus configured to record management information of a first address region updated by a first writing request from an input apparatus, receive the first writing request and a reading request from a storage apparatus and suspend and resume the reading request based on the management information;
a cache memory; and
an access suppression apparatus configured to monitor a second writing request for data from the cache memory to a main memory and suppress, when a second address region in which the data is stored is a predetermined address region, writing of the data,
wherein the access suppression apparatus records management information of the predetermined address region, compares management information of the predetermined address region with contents of the writing request to the main memory, and controls processing of the second writing request to the main memory.

14. The data access control apparatus according to claim 13, wherein the first address region and the predetermined address region are identical regions.

* * * * *